Figure 1:
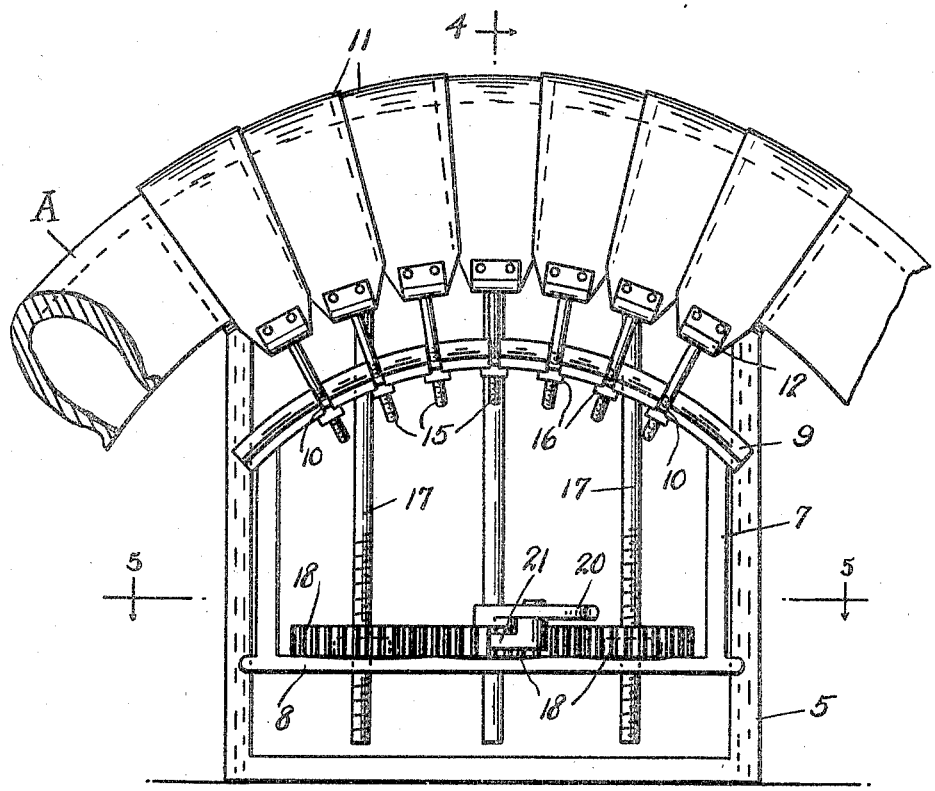

July 16, 1929.　　　G. E. SEASE　　　1,721,094

TIRE VULCANIZING APPARATUS

Filed April 14, 1928　　　2 Sheets-Sheet 1

Inventor

George E. Sease

By Clarence A. O'Brien
Attorney

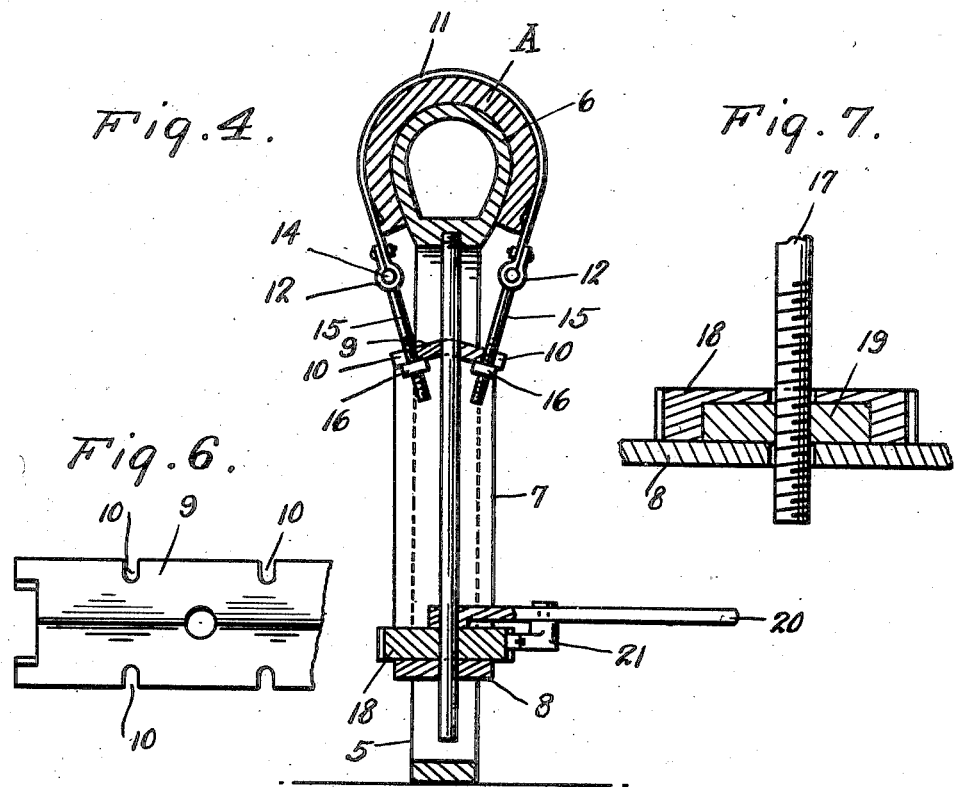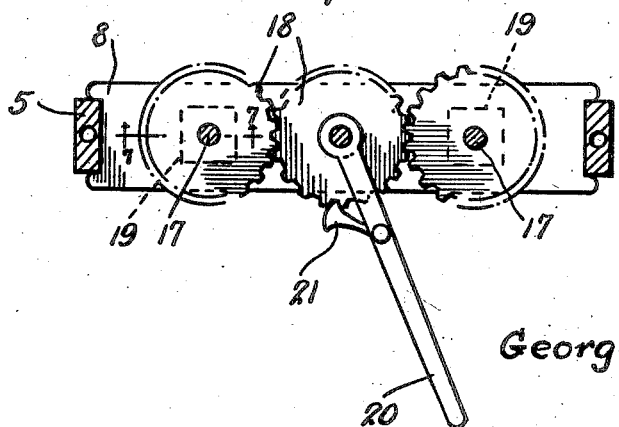

Patented July 16, 1929.

1,721,094

UNITED STATES PATENT OFFICE.

GEORGE EDWIN SEASE, OF CALDWELL, IDAHO.

TIRE-VULCANIZING APPARATUS.

Application filed April 14, 1928. Serial No. 270,041.

This invention relates to new and useful improvements in tire vulcanizing devices and aims to provide a device including a plurality of metallic straps for engagement over the tire arranged upon the form or last together with means for exerting the required pressure upon these straps so that the tire will be maintained in proper engagement with the form or last during the vulcanizing operation.
An important object of this invention resides in the provision of means whereby the tire engaging straps may be readily taken off of the tire and quickly associated with or removed from the strap drawing mechanism of the apparatus.

A further and very important object resides in the provision of simple means for drawing the straps into tight engagement with the tire when the same is arranged upon the form or last.

With the foregoing and other objects in view as the nature of the invention will be better understood, the same comprises the novel form, combination and arrangement of parts hereinafter more fully described, shown in the accompanying drawings and claimed.

In the drawings wherein like reference characters indicate corresponding parts throughout the several views:—

Figure 1 is a side elevation of my improved vulcanizing apparatus a tire being fragmentarily shown as associated therewith.

Figure 2:
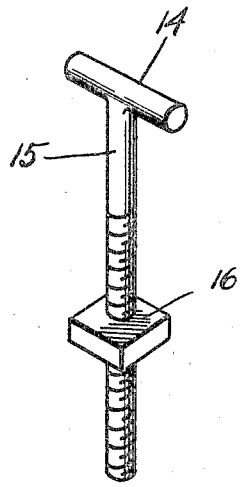
Figure 3:
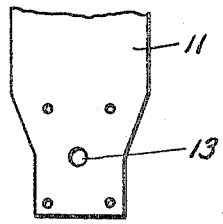

Figure 2 is a perspective of one of the strap bolts, Figure 3 is a plan view of one end of one of the straps before the same has been arranged to accommodate its strap bolt.

Figure 4 is a vertical section taken substantially upon the line 4—4 of Figure 1, Figure 5 is a horizontal section taken substantially upon the line 5—5 of the same figure, Figure 6 is a fragmentary plan view of the strap plate of the strap drawing mechanism, and Figure 7 is an enlarged fragmentary horizontal section taken substantially upon the line 7—7 of Figure 5.

Now having particular reference to the drawings my novel vulcanizing apparatus consists of an open rectangular frame 5 formed or equipped at its upper end with a segmental tire receiving form or last 6 adapted to be heated in any desirable manner and over which the tire A to be vulcanized is arranged.

Vertically slidable within the frame 5 is a sub-frame 7 including a lower horizontal wall 8 and an upper segmental strap plate 9 the opposite longitudinal edges of which are formed with notches 10. The ends of the horizontal wall 8 as well as the segmental strap plate 9 are notched for receiving the vertical members of the said frame 5 so that the sub-frame 7 will be guided in its vertical sliding movement within said main frame 5.

The invention further consists of a plurality of metallic straps 11 curved to conform to the outer curvature of the tire A, the ends of these straps being of reduced width and being bent rearwardly upon themselves and then secured to the bodies of the straps the bight portions of the bent ends being shaped to provide pin receiving knuckles 12 each knuckle being formed intermediate its ends and at the bottom surface thereof with an opening 13. Arranged within the knuckle of each metallic strap 11 is the cross pin 14 of a T-bolt 15 the shank of which extends through the opening 13 in said strap knuckle as more clearly disclosed in Figure 4. Threaded upon each T-bolt is a notch 16 for arrangement beneath the strap plate 9 when the shank of the bolt is arranged within the adjacent notch 10 of said strap plate of the sub-frame 7, see Figures 1 and 4.

Depending from the form or last 6 are three parallel shafts 17 that project through registering openings in the horizontal wall 8 of the segmental strap plate 9 of the sub-frame 7 the lower ends of the endmost shafts 17 being threaded as disclosed in Figures 1 and 7.

Arranged upon the top surface of the horizontal wall 8 of the sub-frame 7 are three intermeshing spur gears 18 through the centers of which extend the shafts 17. The under surfaces of the outermost gears 18 are formed with angular pockets for receiving similarly shaped nuts 19 for threaded engagement upon the threaded ends of the outermost shafts 17.

Pivoted to the outermost shaft 17 above the middle gear 18 is a hand lever 20 equipped adjacent its inner end with a pivoted dog 21 for engagement with the teeth of the adjacent gear.

In actual practice the straps 11 are arranged loosely over the tire A when the same is disposed upon the form or last 6. The first strap disposed over the tire A is arranged at the middle of this form or last 6 and the next adjacent straps overlap the edges of the center strap and have overlapping engagement with each other as clearly disclosed in Figure 1. The T-bolts at the ends of these straps are then loosely arranged in the notches 10 of the sub-frame strap plate 9 after which the lever 20 is actuated for turning the middle gear 18 which obviously rotates the endmost gears threading the nuts 19 downwardly upon the threaded ends of the outermost shafts 17—17 causing the downward movement of the sub-frame 7 and the pulling the entire layer formed by the straps 11 into tight engagement with the tire so as to maintain the same in close contact with the form or last 6. Any additional tightening of these straps 11 may be taken care of by turning the nuts 16 inwardly upon the T-bolts 15.

It will thus be seen that I have provided a highly novel, simple and extremely useful and efficiently operating vulcanizing device and even though I have herein shown and described the invention as consisting of certain detail structural elements, it is nevertheless to be understood that some changes may be made therein without affecting the spirit and scope of the appended claim.

Having thus described my invention, what I claim is:—

In a tire vulcanizing apparatus of the character described, a main frame, a segmental form or last associated with the frame and upon which the tire to be vulcanized is to be arranged, a plurality of metallic straps adapted to be arranged over the tire in edge overlapping relation, means slidably associated with the said frame, means whereby said means may be manually slid in opposite vertical directions within the main frame and detachable connections between the ends of the straps and said means slidable within said frame, said detachable connections consisting of bolts associated with the ends of the straps upon which are arranged nuts for taking up the individual play in each strap and a strap plate fitted in said slidable means having notches in its opposite edges for receiving the bolts for moving all of the straps inwardly in unison.

In testimony whereof I affix my signature.

GEORGE EDWIN SEASE.